United States Patent [19]

Yatcilla

[11] 4,020,913
[45] May 3, 1977

[54] TONGUE-MOUNTED YIELDABLE PTO DRIVELINE SUPPORT

[75] Inventor: George E. Yatcilla, Newton, Kans.

[73] Assignee: Sperry Rand Corporation, New Holland, Pa.

[22] Filed: Sept. 15, 1975

[21] Appl. No.: 613,135

[52] U.S. Cl. .............................. 180/14 R; 64/23; 74/15.69
[51] Int. Cl.² .......................................... F16D 3/00
[58] Field of Search ............ 180/14 R, 14 A, 14 B, 180/14 E; 64/6, 23; 74/15.69, 15.7, 15.6

[56] References Cited
UNITED STATES PATENTS

| | | | |
|---|---|---|---|
| 1,827,070 | 10/1931 | Coultas et al. | 180/14 R |
| 1,898,114 | 2/1933 | Zink | 180/14 R |
| 1,906,322 | 5/1933 | Livesay | 180/14 R |
| 1,999,841 | 4/1935 | MacGregor | 180/14 R |
| 2,349,923 | 5/1944 | Anderson et al. | 180/14 R |
| 2,427,824 | 9/1947 | Vutz | 180/14 R |
| 2,429,492 | 10/1947 | Scranton | 180/14 R |
| 2,614,405 | 10/1952 | Clausen | 64/23 |
| 2,862,568 | 12/1958 | Kock | 180/14 R |
| 3,483,683 | 12/1969 | McCanse | 64/23 |
| 3,557,892 | 1/1971 | Burrough | 180/14 R |
| 3,800,556 | 4/1974 | Duerksen | 64/6 |
| 3,908,398 | 9/1975 | Braunberger | 180/14 B |

FOREIGN PATENTS OR APPLICATIONS 992,285 10/1951 France .................. 180/14 R Primary Examiner—Joseph F. Peters, Jr.
Assistant Examiner—J. D. Rubenstein
Attorney, Agent, or Firm—John R. Flanagan; Frank A. Seemar; Michael R. Swartz

[57] ABSTRACT

In a draft implement having an input power driveline and a tongue adapted to be articulately connected to a tractor, an arm is pivotally mounted on the tongue and supports the driveline rearwardly of a forward telescoping assembly of the driveline which includes forward and rear universal joints. Centering tension springs extending along the tongue and interconnecting the pivotal arm and the tongue maintain the arm in a centered position in which the rear universal joint is positioned the same distance rearwardly of the tractor/implement articulate connection point as that at which the forward universal joint is positioned forwardly of the connection point. The springs will yield to allow the arm to pivot laterally to either side of the tongue to accommodate bottoming out of the telescoping assembly during sharp turns of the tractor relative to the implement. Once the tractor is re-articulated out of the sharp turn relative to the implement, the springs return the arm to its centered position.

6 Claims, 5 Drawing Figures

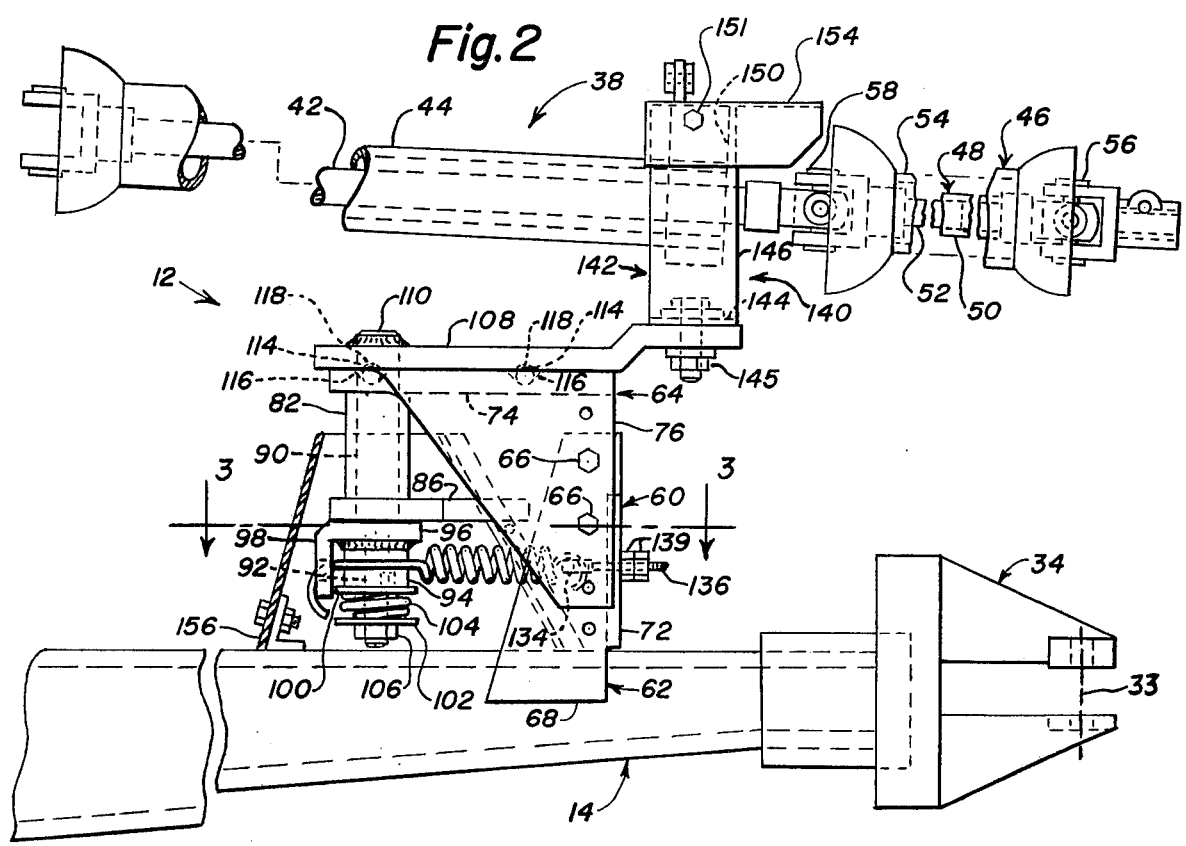
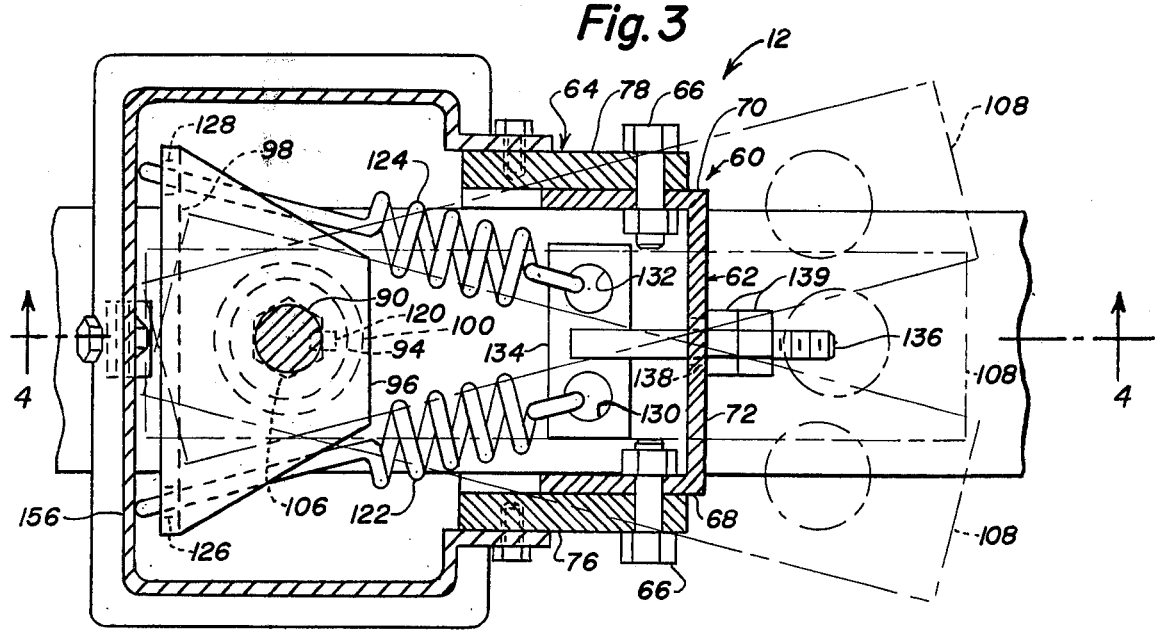

TONGUE-MOUNTED YIELDABLE PTO DRIVELINE SUPPORT

BACKGROUND OF THE INVENTION

1. Field of the Invention

The present invention relates generally to draft implements of the type having an input driveline connected to and powered by a power takeoff shaft of the towing vehicle and, more particularly, is concerned with improved means for supporting the implement driveline so as to accommodate bottoming out of a telescoping assembly in the driveline during sharp turns of the tractor relative to the implement.

2. Description of the Prior Art

Balers, mower-conditioners and other agricultural pull-type implements commonly have a tongue which is adapted to be articulately connected at its hitch end to the drawbar of a tractor. Also, such implements commonly have an input driveline adapted to be connected to the power takeoff shaft of the tractor for transmitting rotary power to the operating components of the implement. The implement driveline frequently includes a forward telescoping drive assembly located above the tongue hitch end and the tractor drawbar which is articulately coupled to the tractor power takeoff shaft by a forward universal joint located forwardly of the connection of the hitch end to the drawbar and articulately coupled to the remainder of the driveline by a rear universal joint located rearwardly of the connection of the hitch end to the drawbar.

During turns of the tractor relative to the implement, if the angle of articulation at the forward universal joint is substantially different than the angle of articulation at the rear universal joint, the rotary speed of the implement driveline will fluctuate relative to the tractor pto shaft rotary speed. The resulting speed variations in the implement driveline are, of course, highly undesirable and produce wear and excessive vibration in the implement driveline.

Therefore, it is desirable to keep the forward and rear universal joint angles as nearly equal as possible during articulation of the tractor relative to the implement. This makes it necessary to make the distance from the rear universal joint to the point of connection between the implement tongue and the tractor drawbar the same as the distance from the forward universal joint to such connection point. It is a standard in the tractor industry, for instance, at 540 rpm power takeoff speeds, that the forward universal joint be approximately 11 11/16 inches from the tongue hitch/drawbar connection point. Thus, when the implement is designed to provide this same distance between the rear universal joint and the tongue hitch/drawbar connection point, the result is that the telescoping drive assembly intercoupled between the forward and rear universal joints has a relatively short length. Since the telescoping parts of the assembly must be capable of extending and retracting as the tractor turns or articulates relative to the implement during field operation and must be long enough so as not to separate during field operation, the assembly will generally bottom out at tractor/implement turning angles which are smaller, or less sharp, than will be required for efficient field operation of the implement.

SUMMARY OF THE INVENTION

The improved implement driveline support means provided by the present invention positions the driveline of the implement such that the rear universal joint of the forward telescoping assembly of the driveline is disposed the same distance rearwardly of the tractor/implement articulate connection point as that at which the forward universal joint of the telescoping assembly is positioned forwardly of the connection point. Therefore, equal angles at the forward and rear universal joints of the telescoping assembly with the implement hitch and tractor drawbar are maintained during most turns of the tractor relative to the implement.

During sharper turns of the tractor relative to the implement which cause bottoming out between the shaft parts of the telescoping assembly, the improved driveline support means, due to the axially-directed forces imposed on the universal joints by the bottomed-out assembly, yields and allows the driveline to move laterally in a direction opposite from the turning direction of the tractor relative to the implement, whereby the bottoming out of the assembly is accommodated without deleterious consequences on the driveline. During the lateral yielding movement of the driveline, the aforementioned angles of articulation at the forward and rear universal joints become somewhat unequal. However, the difference between the angles is so slight that no severe speed variation in the implement driveline is encountered.

Once the tractor is re-articulated away from the sharp turning angle relative to the implement and the bottomed-out condition of the assembly is relieved, the improved driveline support means returns the driveline to its original position in which the forward and rear universal joints of the assembly are equidistantly displaced from the tractor/implement articulate connection point.

Accordingly, the present invention broadly relates to an improved driveline support means incorporated in a draft or pull-type implement, such as a baler. The implement has an input power driveline and a tongue adapted to be articulately connected to a tractor or the like for pulling the implement across a field. The driveline includes a telescoping drive assembly, a forward universal joint for articulately coupling said telescoping assembly to a power takeoff shaft of the tractor at a location forwardly of said articulate connection point of the implement tongue to the tractor and a rear universal joint for articulately coupling the telescoping assembly to the remainder of the driveline at a location rearwardly of the articulate connection point of the implement tongue to the tractor, the forward and rear universal joints being equidistantly displaced from the implement/tractor articulate connection point.

The improved driveline support means includes arm means interconnected to and supported by the tongue for pivotal movement relative to the tongue about a generally upright axis defined proximate one end of the arm means. The arm means proximate its opposite end is interconnected to and supports the driveline rearwardly of the rear universal joint of the telescoping assembly.

Also included in the improved support means is resilient means extending along the implement tongue and interconnected to the tongue and arm means. The resilient means normally maintains the arm in a centered position in which the rear universal joint is caused to be positioned the same distance rearwardly of the tractor-/implement articulate connection point as that at which the forward universal joint is positioned forwardly of the connection point.

The resilient means is yieldable for allowing lateral pivoting of the arm means and thereby lateral movement of the driveline and rear universal joint thereof in a direction opposite from the turning direction of the tractor relative to the implement, due to axially-directed forces imposed upon the arm means by the bottoming out of the telescoping assembly during sharp turning of the tractor relative to the implement, whereby the bottoming out of the assembly is accommodated without damage to the driveline. Further, the resilient means acts to restore the arm means to its centered position upon re-articulation of the tractor out of its sharp turn relative to the implement.

The advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 2 is an enlarged, fragmentary right side elevational view of the baler tongue, driveline and improved driveline support;

FIG. 3 is an enlarged sectional view taken along line 3—3 of FIG. 2;

DETAILED DESCRIPTION OF THE INVENTION

In the following description, right hand and left hand references are determined by standing at the rear of the baler and facing in the direction of foward travel. Also, in the following description, it is to be understood that such terms as "forward," "rearward," "left," "upwardly," etc., are words of convenience and are not to be construed as limiting terms.

IN GENERAL

Figure 1:
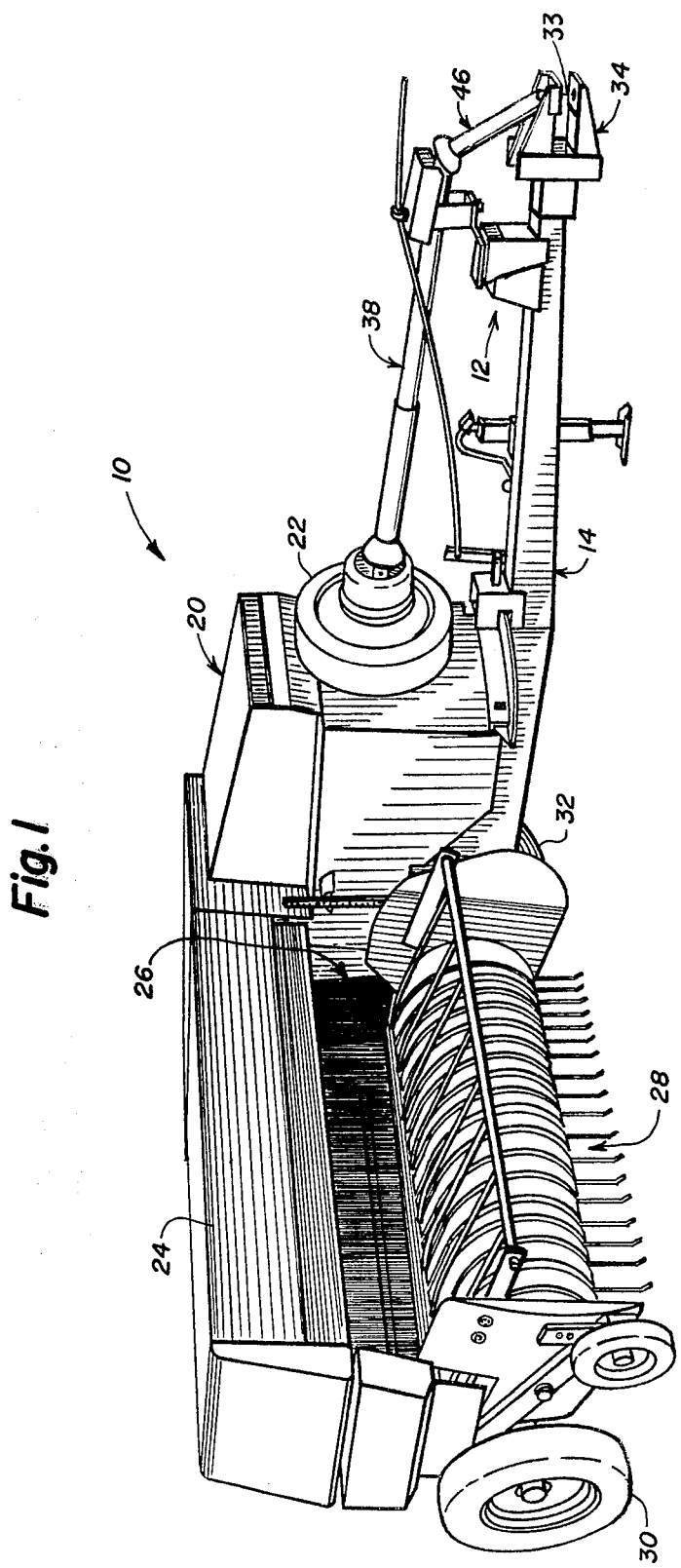
FIG. 1 is a perspective view of a baler embodying the principles of the present invention.

Referring now to the drawings, and particularly to FIG. 1, there is shown a hay baler, being indicated generally by numeral 10, incorporating the preferred embodiment of the improved driveline support means, designated by numeral 12, of the present invention. While the support means 12 is illustrated on a hay baler, it should be understood that the support means 12 is applicable to other pull-type or draft implements, such as mower-conditioners, forage harvesters, etc.

The baler 10 includes a tongue 14 extending forwardly of the baler for attachment to a tractor 16 (FIG. 5), a fore-and-aft extending bale case or chamber 18 (FIG. 5) having a forward end 20 on which a flywheel 22 is rotatably mounted, a feeder housing 24 transversely located adjacent the right side of the bale chamber 18 within which is mounted a feeding mechanism adapted to convey crop material into the bale chamber 18 through inlet opening 26, and a rotatable pickup 28 mounted on the baler 10 forwardly of and below the feeder housing 24 and adapted to lift crop material from the field and deliver it to the feeding mechanism.

A plunger (not shown) is mounted for reciprocable movement in the bale chamber 18 for forming the crop material conveyed therein through inlet opening 22 into rectangular bales. As the bales are formed in the bale chamber 18, they move progressively toward the rear end of the bale chamber 18. After each bale is completed, it is banded with a suitable tying medium and, subsequently, emerges from the rear or discharge end of the bale chamber 18.

The baler 10 is supported by right and left ground-engaging wheels 30,32 and, when articulately connected at location 33 of a hitch end 34 of its tongue 14 to the drawbar 36 (FIG. 5) of the tractor 16, it may be towed across a field.

An input driveline, generally designated by numeral 38, being connected at its rear end to the baler flywheel 22, is adapted for connection at its forward end to the power takeoff (pto) shaft 40 (FIG. 5) of the tractor 16 for rotation in unison therewith to supply rotary driving power to the operating components of the baler 10 through additional power transmitting components (not shown).

Referring now to FIG. 2, the driveline 38 includes rear input drive shaft 42, being positioned above and generally extending along the baler tongue 14 and covered by a telescoping shield 44, and a forward drive assembly, generally designated as 46. The forward assembly 46 is comprised by a telescoping drive assembly 48 (formed by front and rear telescoping shaft parts 50,52), being covered by a telescoping shield 54, and forward and rear universal joints 56,58 for respectively articulately coupling the front and rear ends of the telescoping drive assembly 48 to the tractor pto shaft 40 and the forward end of the input drive shaft 42.

IMPROVED DRIVELINE SUPPORT MEANS

The driveline 38 just rearwardly of its rear universal joint 58 is supported generally above the baler tongue 14 by the improved driveline support means 12 of the present invention so as to be normally positioned the same distance rearwardly of the tractor/implement articulate connection location or point 33 as that at which the forward universal shaft 56 would be positioned forwardly of the articulate connection point 33.

Figure 4:
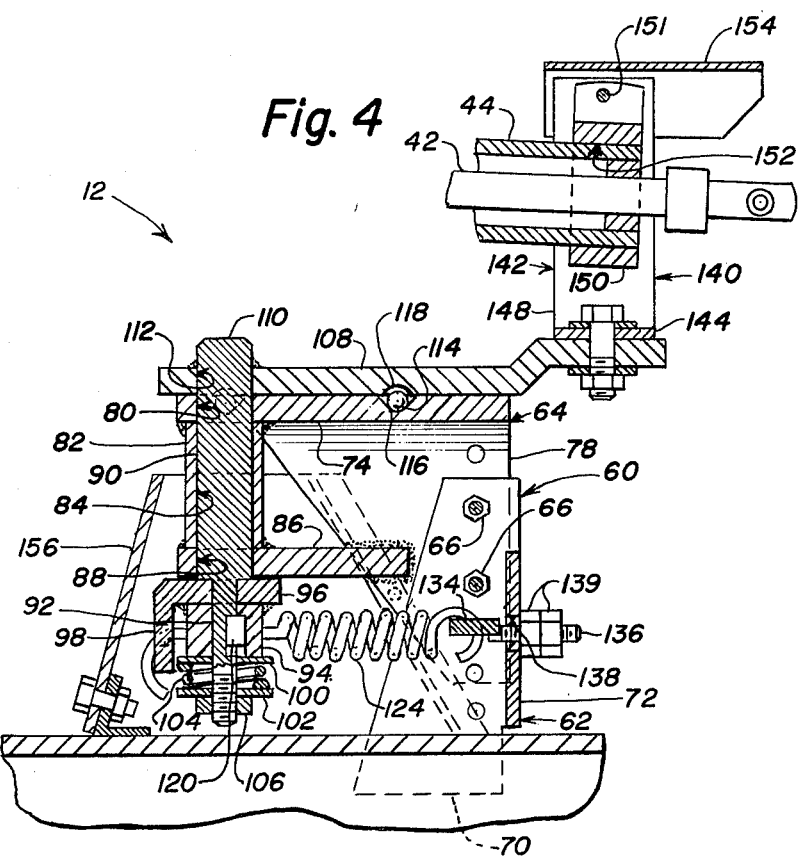
FIG. 4 is a sectional view taken along line 4—4 of FIG. 3, but on a somewhat smaller scale than that of FIG. 3, showing the left half of the improved driveline support.

As illustrated in detail in FIGS. 2 through 4, the improved support means 12 includes a first upright support assembly 60 having a lower, generally U-shaped bracket member 62 and an upper, generally U-shaped brace member 64 which fits over the lower member 62 and is fastened thereto by bolts 66.

The lower bracket member 62 is formed by a pair of upright side parts 68,70 which are secured at their lower ends to the respective sidewalls of the tongue 14 and an upright web part 72 which extends transversely across the upper wall of the tongue 14 and interconnects with the side parts 68,70.

The upper brace member 64 is formed by a top plate 74 from the opposing side edges of which respectively depend a pair of side plates 76,78 which respectively extend along the outer faces of the side parts 68,70 of the lower bracket member 62 and are fastened thereto by the bolts 66. The rear edges of the side plates 76,78 taper from the top plate 74 forwardly and downwardly to thereby provide the upper brace member 64 with a rearwardly projecting configuration. The rear end portion of the top plate 74 has a circular opening 80 formed therein. A vertically-disposed cylindrical sleeve 82 is welded to the underside of the top plate 74 so as to depend therefrom and defines a cylindrical bore 84 having substantially the same internal diameter as the diameter of the top plate opening 80. The cylindrical sleeve 82 is welded at its lower end to the top surface of one end of a horizontal plate 86 through which is formed an opening 88 also having substantially the same diameter as the sleeve bore 84 and the top plate opening 80. The opposing side portions of the other end of the horizontal plate 86 are welded to the interior faces of the side plates 76,78 of the upper brace member 64. Therefore, the upper brace member 64, the sleeve 80 and the horizontal plate 82 form a rigid structure which may be adjustably fastened to the lower bracket member 62 at various heights above the upper wall of the tongue 14.

The improved support means 12 further includes a cylindrical element 90 which is rotatably mounted in and extends vertically through the passageway formed by openings 80,88 and bore 84. The lower portion of the element 90 is in the form of a reduced diameter section 92 receiving a collar 94 fixed on and depending from a horizontal bracket 96 which tapers at its rear end so as to extend laterally outwardly from the element 90 and is formed with a downturned rear ledge 98. The reduced diameter section 92 of element 90 extends below the collar 94 and is there encircled by a pair of spaced apart washers 100,102 between which is confined a compression spring 104. A nut 106 is fastened to a lower threaded end of the reduced diameter section 92 to retain the washers 100,102 and the compression spring 104 about the section 92.

The improved support means 12 is also provided with an elongated arm 108 which receives the top end 110 of the cylindrical element 90 through a circular opening 112 formed in the rear end of the arm 108. The arm 108 is welded to the portion of the cylindrical element 90 top end 110 which protrudes above the arm 108 and thereby will pivotally move laterally toward and away from the tongue 14 upon rotation of the cylindrical element 90 about its vertical axis. The compression spring 104 at the lower end of the element 90 biases the cylindrical element 90 downwardly such that the arm 108 is forceably held toward the upper face of the top plate 74 of the upper brace member 64. Several balls 114 are confined and held in recesses 116 formed in the top plate 74 and protrude slightly above its upper face. Complimentary recesses 118 are formed in the undersurface of the arm 108 which receive the protruding portions of the balls. The balls 114 and recesses 116,118 form a detent arrangement between the arm 108 and plate 74. A key 120 is frictionally fitted in a slot formed in collar 94 and protrudes into a vertical groove in the reduced diameter section 92 of cylindrical element 90. The key 120 prevents rotation of the element 90 relative to the collar 94 and bracket 96, but allows the element 90 to slide vertically relative to collar 94 and bracket 96. Thus, as the element 90 is rotated from its normal position, such as seen in FIG. 3, in either a clockwise or counterclockwise manner when the arm 108 is pivoted laterally from its solid line to either of its right or left broken line positions of FIG. 3, the bracket 96 will move in unison with the element 90 and the element 90 initially simultaneously moves vertically upward as it rotates until the balls 114 unmate from recesses 118 in the arm 108.

The improved support means 12 is further provided with resilient means in the form of a pair of identical elongated tension springs 122,124 which interconnect the tongue 14 with the pivotal arm 108 respectively via the upright support assembly 60 and the bracket 96 keyed to the cylindrical element 90 through the collar 94.

The rear ends of the springs 122,124 are respectively hooked through openings 126,128 formed in the opposite ends of the rear ledge 98 on the bracket 96, while the front ends of the springs 122, 124 are respectively hooked through openings 130,132 formed in opposite ends of a tab 134. A threaded rod 136 is attached to and extends from the middle of the tab 134 through an opening 138 formed in the upright web part 72 of the lower bracket member 62. A pair of nuts 139 are fastened on the forward end of the threaded rod 136 and tightened against the front face of the web part 72 so as to place the springs 122,124 in a slightly extended condition. The springs 122,124 hold the arm 108, through the bracket 96 and rotatable cylindrical element 90, in a normal, generally centered position, being assisted by spring 104 and the ball and recess detent arrangement between the arm 108 and plate 74.

Finally, the improved support means 12 includes a second upright support assembly 140 having a generally U-shaped support member 142. The member 142 has a horizontal base 144 rotatably fastened about a vertical axis to the forward end of arm 108 by bolt 145 and a pair of upstanding legs 146,148 between the top ends of which is fastened a bearing block 150. The block 150 is mounted for rotation about a horizontal axis defined by bolt 151 to accommodate the driveline 38 to vertical adjustment of brace member 64 relative to bracket member 62. The block 150 has a central bore 152 through which the input drive shaft 42 is received and rotatably mounted rearwardly of the rear universal joint 58 of the driveline 38. When the springs 122,124 dispose the arm 108 in its normal centered position, the rear universal joint 58 and forward universal joint 56 will be disposed equidistantly from the tractor/implement articulate connection point 33.

Additionally, a shield 154 is attached to the legs 146, 148 of the support member 142 to cover the rear portion of the rear universal joint 58 and the front end of the input shaft 42. Also, a shield 156 is mounted to the tongue and side plates 76,78 of the upper brace member 64 so as to cover the rotatable cylindrical element 90, collar 94, bracket 96 and rear ends of springs 122,124.

OPERATION

As mentioned hereinbefore, the springs 122,124 of the improved support means 12 maintain the pivot arm 108 in a centered position and thereby the rear universal joint 58 the same distance rearwardly from the tongue/tractor articulate connection point 33 as that of the forward universal joint 56 forwardly from connection point 33. Such equidistant arrangement is maintained until bottoming out occurs between shaft parts 50,52 of the forward telescoping assembly 48. Such bottoming out does not occur during tractor-to-implement turning angles less than approximately 70° (relative to the forward direction). Therefore, the articulation angles at the forward and rear universal joints 56,58 remain relatively equal during less than 70° turns of the tractor relative to the implement.

Figure 5:
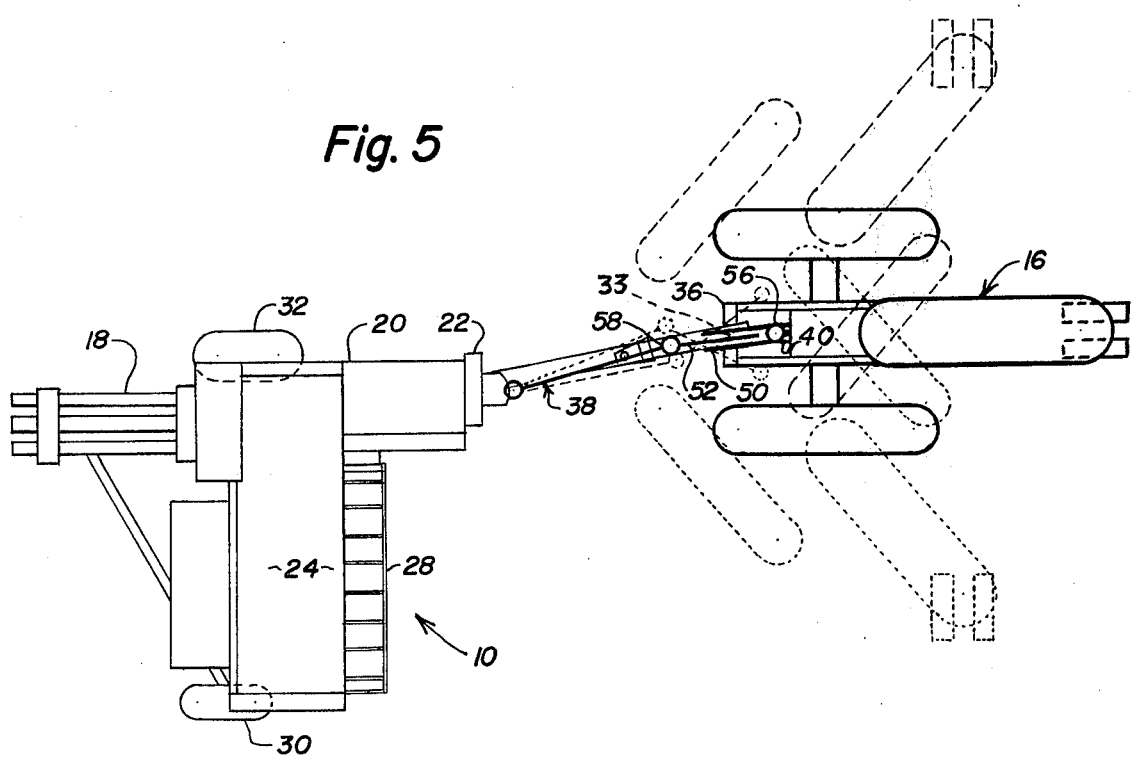
FIG. 5 is a schematic representation of a baler articulately connected to a tractor and of respective positions of the driveline and improved driveline support when the tractor is aligned in a normal forward direction as well as when it is turning sharply to the left and right with respect to the baler.

When the tractor-to-implement turning angles exceed approximately 70°, such as schematically represented in FIG. 5, then axially-directed forces are imposed on the universal joints 56,58 by the bottomed-out telescoping assembly 48. If both of the universal joints 56,58 were rigidly anchored, then continued turning of the tractor relative to the implement beyond the 70° limit would result in damage to one or both of the universal joints. However, the axial force on the rear universal joint 58 substantially instantaneously will exceed the centering force of one of the springs 122,124 (depending upon which direction the tractor is turning relative to the implement) and the centering assist force of spring 104 with the detent arrangement and cause yielding of the respective one of the springs 122,124 rotation of element 90 and lateral pivoting of the arm 108 to a respective one of the right or left displaced positions, as illustrated in broken line form in FIG. 3.

As arm 108 pivots laterally, the rear universal joint 58 and remainder of driveline 38 laterally move to a corresponding one of the offset positions shown in dotted line form in FIG. 5. It will be noted that the lateral movement of the arm 108 and rear universal joint 58 is in a direction opposite to the direction in which the tractor is turned relative to the implement. Therefore, the bottoming out of the telescoping assembly 48 is accommodated in the driveline 38 without any resultant damage to the universal joints.

Once the tractor is turned back toward a relatively forward alignment with the implement (as seen in solid line form in FIG. 5) such that the turning angle decreases below seventy degrees, bottoming out of the telescoping assembly 48, and thus the axial force caused thereby, is relieved and the corresponding one of the springs 122,124 will cause reverse rotation of the element 90, pivoting of the arm 108 back to its centered position and return of the rear universal joint 58 and remainder of the driveline 38 back to their original position, as seen in solid line form in FIG. 5.

It should be noted that the remainder of the driveline 38 is also, preferably, in the form of a telescoping assembly to accommodate lateral adjustment of the tongue 14 between field and operating positions as well as lateral offset of the driveline 38 during the above-described sharp turns of the tractor relative to the implement.

Another advantage of the improved driveline support means 12 is that it eliminates the need for some type of special tongue hook-up or hitch adapter in order to achieve equalization of the universal joint angles. Therefore, the present invention offers easier and more convenient tractor attachment to the implement tongue.

It is thought that the invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. An improved means mounted on a tongue of a draft implement having an articulated input driveline, said means normally supporting said driveline in a predetermined longitudinally extending position for operative drive connection with a power shaft of a tractor or the like which tows the implement through an articulation connection with the implement tongue, said supporting means comprising:
    a support mounted on said tongue;
    an element mounted to said support for rotational movement relative thereto about a generally upright axis;
    a generally horizontal arm being rigidly connected at one end to an upper portion of said rotatable element for movement therewith, said arm at an opposite end being interconnected to and supporting said driveline; and
    a pair of tension springs interconnecting and extending generally between said support and a lower portion of said rotatable element so as to normally maintain said element and thereby said arm in a centered position such that said arm will support said driveline in said predetermined longitudinal position, each of said springs being yieldable to allow rotation of said element such that said arm will pivotally move laterally and allow lateral movement of said driveline therewith to accommodate sharp turns of the tractor relative to the implement, said springs being interconnected with opposite sides of said rotatable element such that one of said springs yieldably resists rotational movement of said element in one direction and the other of said springs yieldably resists rotational movement of said element in a direction opposite to said one direction.

2. The improved supporting means as recited in claim 1, wherein:
    said element includes means projecting outwardly from said opposite sides of said element; and
    corresponding one ends of said springs are respectively connected to portions of said projecting means at respective locations radially spaced from said opposite sides of said element.

3. The improved supporting means as recited in claim 1, further including:
    means interconnecting corresponding opposite ends of said springs and said support and operable for adjusting the tension in said springs.

4. The improved supporting means as recited in claim 1, wherein:
    said support is comprised by lower and upper portions, said lower portion being fixed to said tongue, said upper portion rotatably mounting said element and being adjustable vertically with respect to said lower portion for mounting said driveline at different heights with respect to said tongue.

5. The improved supporting means as recited in claim 1, further including:
    means operatively associated with said rotatable element, said arm and said support for assisting said springs in maintaining said element and arm in said centered position.

6. In a draft implement having a tongue adapted to be articulately connected to a tractor or the like for pulling said implement across a field and an input power driveline, said driveline including a forward telescoping drive assembly, a forward universal joint for articulately coupling said telescoping assembly to a power takeoff shaft of the tractor at a location forwardly of said articulate connection of said implement tongue to said tractor and a rear universal joint for articulately coupling said telescoping assembly to the remainder of said driveline at a location rearwardly of said articulate connection of said implement tongue to said tractor, an improved means for supporting said driveline so as to accommodate bottoming out of said telescoping drive assembly due to the occurrence of sharp angles of articulation of said tractor relative to said implement tongue during sharp turns of said tractor relative to said implement, said improved support means comprising:

an element mounted above said tongue for rotational movement about a generally upright axis;

an arm disposed above said tongue and being secured at one end to an upper portion of said rotatable element for rotational movement therewith about said generally upright axis, said arm at an opposite end being connected to and supporting said driveline rearwardly of said rear universal joint; and a pair of springs disposed above said tongue and extending therealong and acting upon said rotatable element and said arm so as to normally maintain said element and arm in a centered position in which said rear universal joint is caused to be positioned approximately the same distance rearwardly of said articulate connection of said implement tongue to said tractor as that at which said forward universal joint is positioned forwardly of said connection, said springs being interconnected to opposite sides of said element and yieldable for respectively allowing rotation and counter-rotation of said element and thereby corresponding lateral pivoting of said arm and lateral movement of said driveline and rear universal joint thereof in a direction opposite from the turning direction of said tractor relative to said implement, due to axially-directed forces imposed upon said universal joints by the bottoming out of said telescoping assembly during sharp turning of said tractor relative to said implement, whereby said bottoming out of said telescoping assembly is accommodated without damage to said driveline, said springs being responsive to re-articulation of said tractor away from its sharp turn relative to said implement to restore said element and arm to said centered position.

* * * * *